United States Patent [19]

Oyama et al.

[11] Patent Number: 4,969,532
[45] Date of Patent: Nov. 13, 1990

[54] CENTRAL DIFFERENTIAL FOR A FOUR-WHEEL DRIVE MOTOR VEHICLE

[75] Inventors: Fusami Oyama; Takeo Inoue, both of Tokyo, Japan

[73] Assignee: Fuji Jukogyo Kabushiki Kaisha, Tokyo, Japan

[21] Appl. No.: 263,637

[22] Filed: Oct. 27, 1988

[30] Foreign Application Priority Data

Nov. 4, 1987 [JP] Japan ................................ 62-279534

[51] Int. Cl.⁵ .......................................... B60K 17/34
[52] U.S. Cl. .................................. 180/233; 180/248;
475/198; 475/230; 475/330
[58] Field of Search ......................... 180/233, 248, 249;
74/695, 700, 701, 713, 711; 475/198, 230, 330

[56] References Cited

U.S. PATENT DOCUMENTS

| Re. 17,039 | 7/1928 | Burkhardt | 74/695 |
| 2,450,073 | 9/1948 | Avila | 74/695 |
| 4,651,587 | 3/1987 | Anderson et al. | 74/713 X |
| 4,754,661 | 7/1988 | Barnett | 74/713 X |
| 4,779,699 | 10/1988 | Hatano | 180/248 |

FOREIGN PATENT DOCUMENTS

| 55-72420 | 5/1980 | Japan . | |
| 61-123250 | 8/1986 | Japan . | |
| 283618 | 10/1952 | Switzerland | 74/695 |
| 1283460 | 1/1987 | U.S.S.R. | 74/695 |

Primary Examiner—Mitchell J. Hill
Attorney, Agent, or Firm—Martin A. Farber

[57] ABSTRACT

A central differential for a four-wheel drive motor vehicle is provided on a pair of axles for right and left drive wheels. The differential has a tubular member secured to a final gear of a transmission, a pair of carriers one of which is connected to the drive wheels and the other carrier is operatively connected to the other drive wheels. A pair of annular side gears are securely provided on the tubular member, and an annular center gear rotatably mounted on the tubular member between the side gears. A pair of planetary gears are rotatably supported in the corresponding carrier. Each planetary gear comprises a pair of planet pinions, one of which is engaged with the side gear and the other is engaged with the center gear.

5 Claims, 2 Drawing Sheets

4,969,532

CENTRAL DIFFERENTIAL FOR A FOUR-WHEEL DRIVE MOTOR VEHICLE

BACKGROUND OF THE INVENTION

The present invention relates to a central differential provided in a power transmission system for a four-wheel drive motor vehicle.

Japanese Patent Application Laid-Open 55-72420 discloses a central differential which comprises a differential case, encasing two differential pinion gears and two bevel side gears meshed with pinion gears, and internally splined to drive wheel axles, and a ring gear attached to the case and engaged with a drive pinion.

In order to restrain the differential operation, two sets of clutch plates operated by oil pressure are provided for locking the drive wheel axles to the case on a slippery road. Pressure oil is applied to clutches through a hydraulic circuit having a solenoid operated valve. Accordingly, the structure of such a central differential is complicated. Further, the central differential is locked, after a control system detects slipping of wheels in accordance with the speed difference of front and rear drive wheels in excess of a predetermined value. Thus, the locking operation is inevitably ineffective.

Japanese Utility Model Application Laid-Open 61-123250 discloses a differential comprising a worm gear and a worm wheel for permitting the differential operation when a motor vehicle makes a turn. When the vehicle travels on a straight road, the differential is locked because of the irreversible function of the worm gear. This differential may be employed for a central differential.

However, in such a structure, since the worm gear device has a large sliding resistance, the transmission efficiency is reduced and wearing of the gears increases. Further, since the worm gear is used, the structure of the differential is complicated so that manufacturing cost increases.

SUMMARY OF THE INVENTION

The object of the present invention is to provide a system which is simple in structure and compact in size.

The other objects and features of this invention will become understood from the following description with reference to the accompanying drawings.

DETAILED DESCRIPTION OF THE PREFERRED EMBODIMENT

Figure 1:
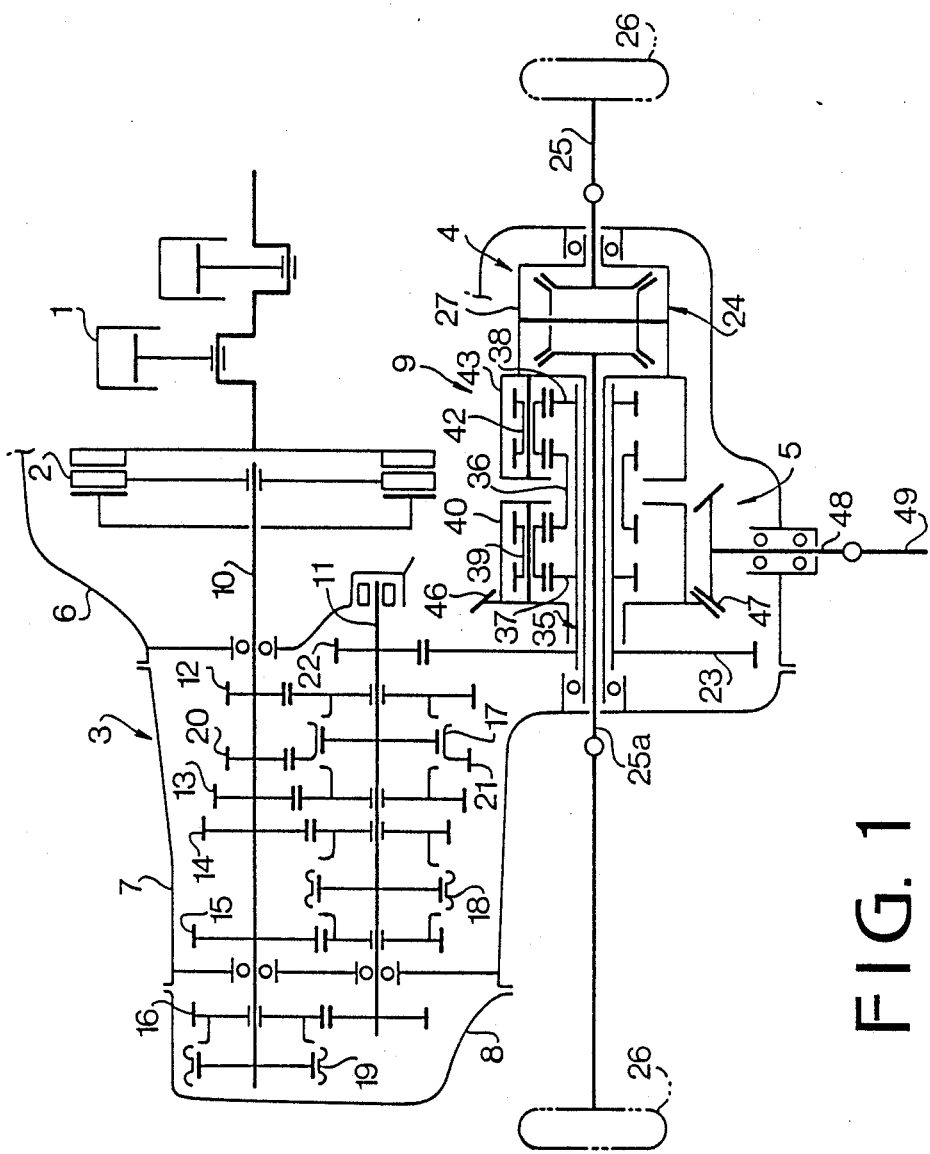
FIG. 1 is a schematic diagram of a four-wheel drive power transmission system of the present invention.

FIG. 1 shows a power transmission system for a four-wheel drive motor vehicle to which the present invention is applied. An engine 1 is laterally mounted on the motor vehicle at a front portion thereof. The power transmission system comprises a clutch 2 housed in a clutch housing 6, transmission 3 and transfer device 6 the latter two being housed in a transmission case 7 and an extension case 8. The transmission 3 has an input shaft 10, an output shaft 11 parallel to the input shaft 10, five pairs of change-speed gears 12 to 16 corresponding to first to fifth (overdrive) speed gears, and synchronizers 17 to 19. The synchronizers 17 to 19 are disposed between the gears 12 and 13, between gears 14 and 15 and adjacent the gears 16, respectively. A reverse drive gear 20 mounted on the input shaft 10 meshes with a gear 21 formed on one side of a sleeve of the synchronizer 17 through an idler gear (not shown) for reverse drive.

A drive gear 22 fixedly mounted on the output shaft 11 meshes with a final gear 23 integral with a differential case 27 of a differential device of the transfer device 5. The transfer device 5 has a central differential 9 and a front differential 4. The central differential 9 (a first differential) is composed of planetary gear devices and disposed between the final gear 23 and a differential device 24 of the front differential 4. The front differential 4 (a second differential) is connected to axles 25 and 25a so as to transmit the power to front wheels 26 of the vehicle.

Figure 2:
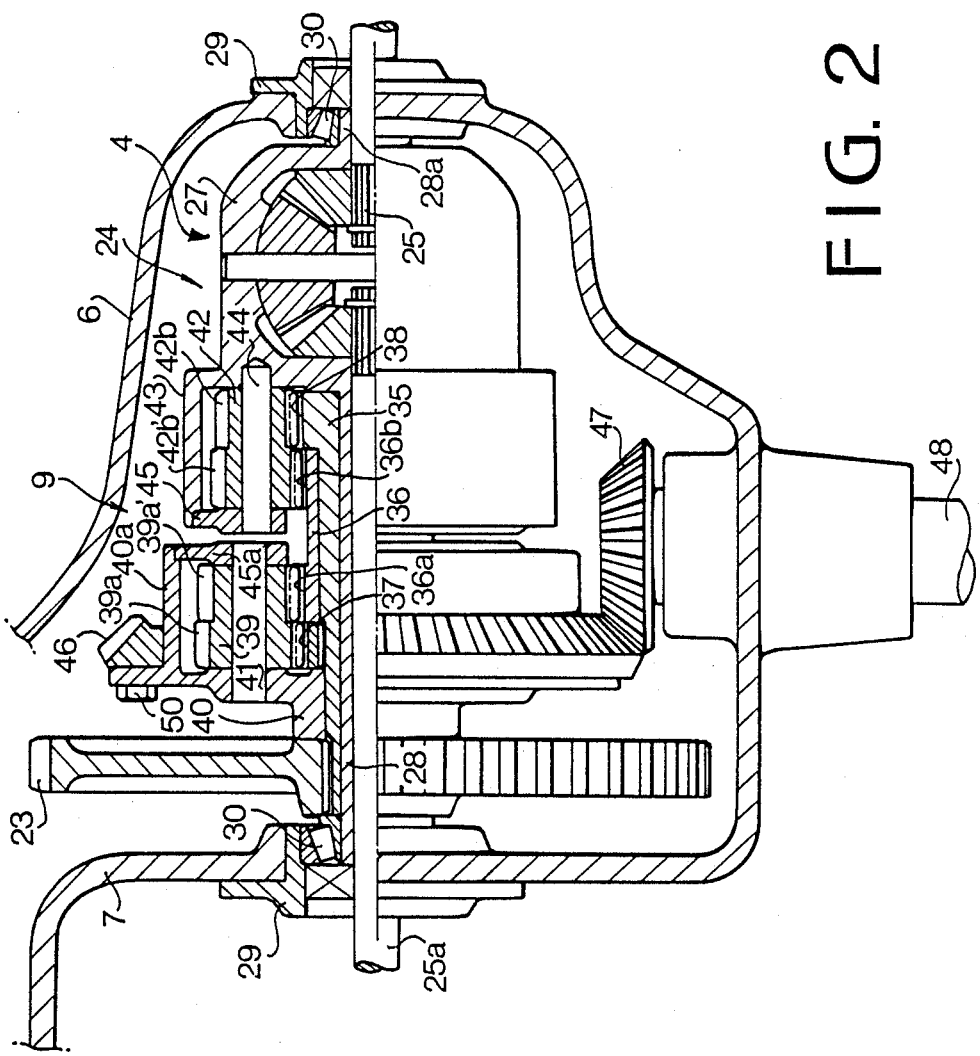
FIG. 2 is a sectional view of a differential system of the present invention.

Referring to FIG. 2, a differential case 27 of the front differential 4 has a hub 28 rotatably mounted on the axle 25a and a hub 28a rotatably mounted on the axle 25. The hub 28 and 28a are rotatably mounted on bearings 30, 30 provided in bearing cases 29.

The central differential 9 comprises an input tubular body 35 rotatably mounted on the hub 28. At an end of the tubular body 35 adjacent the case 27, an annular projection is formed, on which an annular external side gear 38 is provided. The final gear 23 is splined to the other end portion of the tubular body 35.

A cylindrical center gear 36 is rotatably mounted on the tubular body 35 adjacent the gear 38. The center gear 36 has a pair of external gears 36a and 36b, which are different from each other in number of teeth. Adjacent the gear 36a, an external side gear 37 is splined to the tubular body 35. The number of teeth of the side gear 37 is different from the number of teeth of the side gear 38.

A carrier 40 having a cylindrical portion 40a is rotatably mounted on the tubular body 35 between the final gear 23 and the side gear 37. A double planet gear 39 is rotatably mounted on a shaft 41 secured to the carrier 40 and a carrier plate 45a. The planet gear 39 has an outer planet pinion 39a meshed with the side gear 37 and an inner planet pinion 39a' meshed with the gear 36a of the center gear 36. The planet pinions 39a and 39a' are different from each other in number of teeth. Three planet gears 39 carried by the carrier 40 are circumferentially disposed on the tubular body 35 at equal angular intervals.

A carrier 43 integral with the differential case 27 carries a double planet gear 42 rotatably mounted on a shaft 44 secured to the case 27 and a carrier plate 45. Similarly, the planet gear 42 has planet pinions 42a and 42b' which are engaged with the side gear 38 and the gear 36b of the center gear 36, respectively. The pinions 42b, 42b' are also different in number of teeth.

An output ring gear 46 in the form of a bevel gear is attached to an outer periphery of the cylindrical portion 40a of the carrier 40 by bolts 50.

Referring to FIG. 1, the output bevel gear 46 engages with a bevel gear 47 securely mounted on a rear drive shaft 48, thereby transmitting the power to rear wheels by way of a propeller shaft 49.

For differential operation, the structure of the gear train of the central differential 9 of the present invention has the when the vehicle goes around a corner, the front and rear driving wheels with respect to the corner move in opposite directions by the same amount.

When the carriers 40 and 43 are rotated one revolution, gear speeds $n_a$ and $n_b$ of internal gears 36$a$ and 36$b$ of the center gear 36 are represented as follows.

$$n_a = 1 - (S_1 \cdot P'_1 / C_1 \cdot P_1)$$

$$n_b = 1 - (S_2 \cdot P'_2 / C_2 \cdot P_2)$$

where $S_1$ is the number of teeth of side gear 37, $C_1$ is the number of teeth of gear 36$a$ of center gear 36, $P_1$ and $P'_1$ are the numbers of the teeth of the planet pinions 39$a$ and 39$a'$ of planet gear 39, $S_2$ is the number of teeth of side gear 38, $C_2$ is the number of teeth of gear 36$b$ of center gear 36, and $P_2$ and $P'_2$ are the numbers of the teeth of planet pinions 42$a$ and 42$b'$ of planet gear 42.

Thus, when a difference between both the equations becomes zero, namely the gear speed $n_a$ equals to the gear speed $n_b$ in the same direction, the differential operation is achieved. In that case, if the speed of the wheels rotated in the reverse direction is represented by the negative quantity, the above equations are expressed as follows.

$$(-n_a) - (+n_b) = 0$$

$$(S_1 \cdot P'_1 / C_1 \cdot P_1) + (S_2 \cdot P'_2 / C_2' \cdot P_2) = 2$$

Thus, the number of teeth of each gear is determined to satisfy the above equation.

On the other hand, when the vehicle drives on a straightaway, the gear train is operated to restrict the rotation of the gears.

Describing the operation, the power of the engine 1 is transmitted to the transmission 3 through the clutch 2 and the input shaft 10. By operating the synchronizers 17, 18 and 19, the power of the engine is transmitted to the final gear 23 through the transmission 3. The transmitted power is further transmitted to the tubular body 35, so that the side gears 37 and 38 rotate the to try to rotate planet gears 39 and 42.

In straightaway driving, each of the planet gears 39 and 42 is subjected to the rotational force of body 35 through the side gears 37 and 38. However, the speeds of both planet gears which are applied to the center gear 36 are different from each other because of the different gear ratios. Accordingly, the center gear 36 cannot be rotated. Thus, the gear train is in an undifferentiating state so that the gears are integrated with the tubular body 35, and, carriers 40 and 43 to equally transmit the power to the front drive wheels 26 through the differential device 24 and drive axles 25 and 25$a$.

At the same time, the power is transmitted to the rear drive wheels (not shown) through the output gear 46, gear 47, and shafts 48, 49.

When the vehicle turns around a corner, the carriers 40 and 43 of the central differential 9 are rotated in the opposite directions, relatively in accordance with the difference between the speeds of the front and rear wheels. The carriers 40 and 43 rotate the planet gears 39 and 42 to rotate gears 36$a$ and 36$b$ of the center gear 36 at the same speeds in accordance with the gear ratios. Thus, the difference between the speeds of the front and rear wheels is absorbed. In this state, the carrier 43 rotates to transmit the power to the differential device 24, where the difference between the speeds of the inner and outer drive wheels is absorbed.

The carrier 40 rotates in the opposite direction to the carrier 43 at the same amount as the carrier 43 to transmit the power to the rear drive wheels, relatively. Accordingly, the vehicle smoothly turns the corner with the central differential function.

On the other hand, if either of the front or rear wheels float or on slippery surface of the road, the load for the wheels reduces. Accordingly, one of planet gears 39 or 42 corresponding to the wheels attempts to rotate. However, since the pitch circles of the planet gears are slightly different from each other, the rotary force dependent on the difference is cancelled by sliding friction on the shaft of the planet gears. Thus, the torque to the wheels going to spin is transmitted to the other wheels, thereby preventing the wheels from spinning.

In accordance with the present invention, a central differential comprises a planetary gear device having a differentiating state during cornering and an undifferentiating (differential locking state) during straightaway driving or driving floating or slipping of wheels. Thus, the structure is simplified and compact in size without a differential restraining/locking device. Since a worm gear device is not employed, friction in the device is reduced at cornering, thereby reducing fuel consumption.

Since the gears for the central differential are coaxially disposed with each other at a position between the final gear and the differential device, the construction is simplified and the lubrication oil for the gears may be sufficiently supplied. A pair of carriers as output members are disposed at an outermost position. Accordingly, the carriers may be easily integrated with the differential device and the output gear.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. In a differential system for a four-wheel drive motor vehicle having a first differential for differentiating front and rear wheels of the vehicle, a second differential operatively connected to a pair of axles for differentiating right and left wheels of a set of drive wheels of the motor vehicle, and a final gear transmitting power from a transmission, the improvement wherein the first differential comprises:

a tubular body rotatably supported around one of said pair of axles and operatively connected to the final gear;

a first carrier secured to a differential case of the second differential;

a second carrier rotatably supported on the tubular body and operatively connected to another set of drive wheels of the motor vehicle;

a pair of side gears forms on the tubular body;

a center gear having a pair of gears and rotatably mounted on the tubular body;

a first planet gear having a pair of planet pinions and rotatably supported on the first carrier;

a second planet gear having a pair of planet pinions and rotatably supported on the second carrier;

one of said pair of planet pinions of the first planet gear being engaged with one of the said pair of side gears and another of said pair of planet pinions of the first planet gear being engaged with one of said pair of gears of the center gear;

one of said pair of planet pinions of the second planet gear being engaged with another of said pair of side gears and another of said pair of planet pinions of the second planet gear being engaged with another of said pair of gears of the center gear; and said pair of planet pinions of each planet gear define pitch circles which are slightly different.

2. The first differential according to claim 1, wherein $(S1.P'1/C1.P1)+(S2.P'2/C2.P2)$ is substantially equal to 2, wherein numbers of teeth of the side gears are S1 and S2, numbers of teeth of the gears of the center gear are C1 and C2, numbers of teeth of the planet pinions of the second planet gear are P1 and P'1, and numbers of teeth of the planet pinions of the first planet gear are P2 and P'2.

3. The first differential according to claim 1, wherein said differential case and said first carrier are mounted rotatably on said one of said pair of axles.

4. A central differential for a four-wheel drive motor vehicle having a transmission, comprising:

a pair of axles;

a differential case rotatably supported on the axles;

a tubular body rotatably supported around one of the axles and operatively connected to an output of the transmission so as to be rotated;

first and second carriers, the first carrier being secured to the differential case, and the second carrier being rotatably supported on the tubular body;

motor vehicle having a differential disposed in the differential case between the axles so as to perform a differentiating operation for right and left wheels of a set of drive wheels of the motor vehicle; the central differential further comprising a pair of side gears formed on the tubular body;

a center gear having a pair of gears and rotatably mounted on the tubular body;

a pair of planet gears, each of said pair of planet gears comprising a pair of planet pinions and each of said pair of planet gears being rotatably supported in a corresponding one of said first and second carriers, respectively;

one of said pair of planet pinions of each planet gear being engaged with a corresponding one of said pair of side gears, respectively, and another of said pair of planet pinions of each planet gear being engaged with a corresponding one of said pair of gears of the center gear, respectively;

the second carrier being operatively connected to another set of drive wheels of the motor vehicle so as to transmit output of the second carrier to said another set of drive wheels; and numbers of teeth of both side gears, numbers of teeth of the gears of the center gear, and numbers of teeth of the planet pinions being such that speeds of the gears of the center gear are equal to each other.

5. The central differential according to claim 4, further comprising a final gear of the transmission is splined to the tubular body.

* * * * *